UNITED STATES PATENT OFFICE.

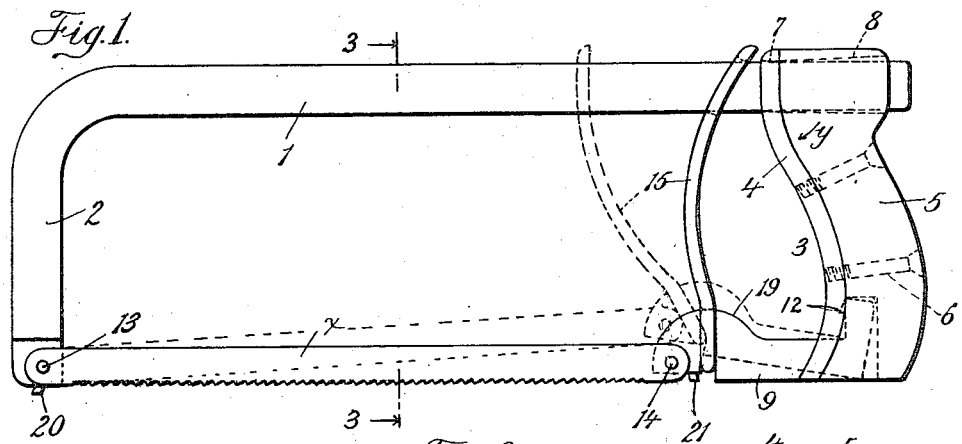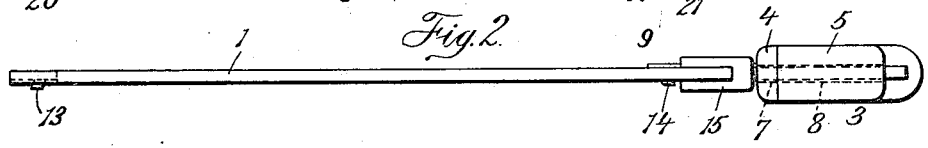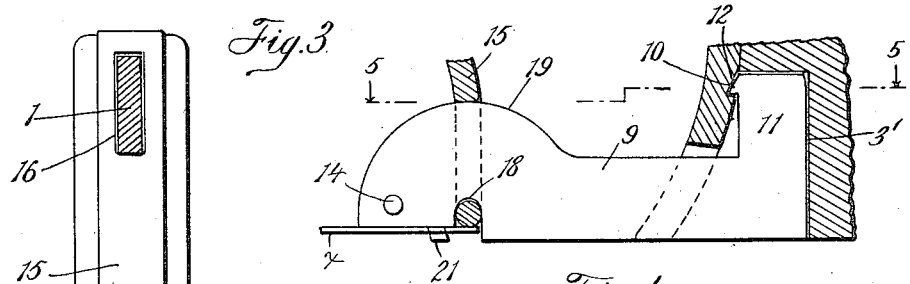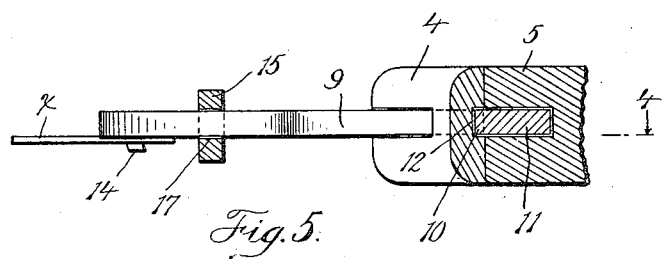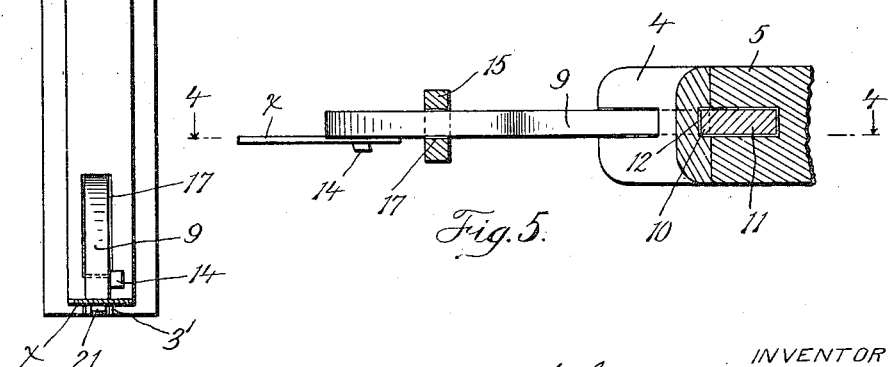

HARRY C. GAMAGE, OF NEW YORK, N. Y., ASSIGNOR TO WILLIS H. SIMPSON, OF EAST ORANGE, NEW JERSEY.

SAW.

1,252,424.     Specification of Letters Patent.     Patented Jan. 8, 1918.

Application filed January 3, 1917. Serial No. 140,360.

*To all whom it may concern:*

Be it known that I, HARRY C. GAMAGE, a citizen of the United States. and resident of city, county, and State of New York, have invented certain new and useful Improvements in Saws, of which the following is a specification.

This invention relates to saws of the type generally known as hack-saws which comprise a comparatively narrow saw-blade detachably secured in a frame provided with a suitable hand grip and which are intended more particularly for use on metals.

The invention has for an object to provide an improved means for securing the saw-blade in the frame which will facilitate the attaching and detaching of the blade.

For further comprehension of the invention, and of the objects and advantages thereof, reference will be had to the following description taken in connection with the accompanying drawings, the various novel features of the invention being more particularly set forth in the appended claims.

Figure 1 of the drawings is a side elevation of a hack saw embodying the invention.

Fig. 2 is an edge view thereof.

Fig. 3 is an enlarged transverse section on the line 3—3 of Fig. 1.

Fig. 4 is a fragmental longitudinal section on the line 4—4 of Fig. 5.

Fig. 5 is a transverse section on the line 5—5 of Fig. 4.

In the embodiment of the invention here illustrated the frame of the hack-saw is of the usual bow shape and comprises a flat bar 1 having at one end an outturned portion 2 and on which is slidably mounted toward the opposite end thereof a grip or handle 3 here shown as comprising a metal bar 4 and a wooden shape 5, the bar serving as a facing and reinforcement to the member 5 which is suitably secured to it as by the screws 6. This slidable mounting is here effected by passing the bar through openings 7 and 8, of similar shape to the cross section of the bar, in the parts 4 and 5 near the head thereof.

Pivoted at one end in a recess 3 in the base of the grip is a link 9 which extends toward the portion 2 of the bar 1 and is adapted to have attached to its opposite end one end of the saw-blade X, the link 9 operatively connecting the grip member 4 and saw blade the other end of which is attached to the frame member 2. I have here shown the pivotal attachment between the grip bar 4 and link 9 as being formed by a tooth 10 on an offset portion 11 of the link 9 and which engages in a suitable notch 12 in the rear face of the grip member 4.

As here shown, the saw-blade may be attached to the frame portion 2 and link 9 by slipping the perforated ends thereof over studs 13 and 14 projecting respectively from the parts 2 and 9. These studs preferably incline outwardly away from one another to insure a firm attachment of the blade in position when properly tensioned.

The tensioning of the blade is effected by means of a wedge member 15 adapted to be wedged between the link 9 and the bar 2 and here shown as a curved thrust-lever 15, formed of metal and provided with slotted apertures 16 and 17 at opposite ends through which the bar 1 and link 9 pass, the connection between the wedge member 15 and link 9 being arranged to pivot the wedge member to the link. To this end the lower face of the link 9 has a semicircular notch 18 formed therein near the end to which the saw blade is attached, the lower end of the wedge member 15 engaging in said notch. The upper face of the link 9 is curved concentric to the notch 18, as at 19, the slot 17 in the wedge member being of proper size to fit snugly on the curved link, the same being hooked over the end of the link before the stud 14 is placed in the latter. When in position the handle bar 4, link 9 and wedge member 15 form a rigid frame or support. The wedge member 15, extending in front of the grip member 4 throughout substantially the length of the latter, forms a guard for the hand holding the grip member.

In Fig. 1 of the drawings I have shown in full lines the various parts in position with the blade properly fixed in the saw. To remove or replace the saw the upper end of the thrust-lever 15 is moved forward on the frame 1, causing the link 9 to swing inward, this position being shown in dotted lines in Fig. 1.

In this latter position the points 13, 14 and 12 are approximately in a straight line and tension upon the saw-blade removed, permitting removal of the latter. To attach the blade in position it is slipped upon the studs 13 and 14 and the wedge bar 15 is swung rearwardly toward the grip 3 forcing the link 9 downward by reason of the sliding-fulcrum engagement between the lever and bar, the inner walls of the slots 16 and 17 bearing against the bar 1 and the curved face 19 on the link which forms an abutment surface. As the points 13, 14 and 12 move away from their straight line position it will be apparent that tension will be placed on the saw blade and the latter held firmly in position.

As the parts come under tension the grip will tend to swing forward on the bar 1 as a pivot, as indicated by the arrow Y, which action will cause the metal bar 4 to bind upon the frame bar 1 and prevent the grip from slipping forward the bar, without necessitating the provision of any tooth and notch device or other arrangement to hold the grip, ready adjustment of the grip on the bar 1 to accommodate saws of different length being thus provided for.

The various parts are preferably so proportioned that when the blade is in position a line between the bearing points of the wedge 15 on the link 9 and bar 1 will be substantially at right angles to said bar while the saw blade and link will be parallel to the bar, the toothed edge of the saw blade being in alinement with the outer face of the link and with the end of the grip member.

It may sometimes be desirable to place the blade in position at right angles to the general plane of the hack-saw and to this end I provide a pair of studs 20 and 21 upon the edge faces of the frame portion 2 and link 9, these studs being similar to and inclined away from one another similarly to the studs 13 and 14, the saw-blade when placed thereon assuming the position shown in Figs. 3 and 4. In this position it will be noted the lower end of the thrust-lever 15 engages the end of the saw-blade and provides a widened bearing therefor to assist in preventing twisting of the blade.

It will be apparent that various changes and modifications might be made in the construction here illustrated without departing from the spirit of the invention and the right is therefore reserved to all changes and modification that come within the scope of the invention as defined in the appended claims.

What I claim is:

1. A hack-saw having a supporting frame for a saw-blade comprising a bar and a grip member, the said blade being adapted to be attached at one end to said bar, a link secured at one end to said grip member and adapted to have the other end of the said saw-blade attached to its opposite end, and a member adapted to be wedged between said bar and link, said wedge member when in wedging position being located a short distance in front of said grip member to provide a guard for the hand holding the latter.

2. A hack-saw having a supporting frame for a saw-blade consisting of a grip member and a bar adapted to have one end of the saw-blade attached thereto, a link pivoted at one end to the grip member and adapted to have the remaining end of the saw-blade attached to its opposite end, and a member adapted to be wedged between the said bar and link, for the purpose set forth.

3. A hack-saw having a supporting frame for a saw-blade consisting of a bar adapted to have one end of the saw-blade attached thereto and a grip member adjustable along said bar, a link pivoted at one end to the grip member and adapted to have the remaining end of the saw-blade attached thereto, and a member adapted to be wedged between the said bar and link, for the purpose set forth.

4. A hack-saw having a supporting frame for a saw-blade consisting of a grip member and a bar adapted to have one end of the saw-blade attached thereto, a link pivoted at one end to the grip member and adapted to have the remaining end of the saw-blade attached to its opposite end, and a wedge member slidably secured at one end to said bar and adapted to have its opposite end engage the link, for the purpose set forth.

5. A hack-saw having a supporting frame for a saw-blade consisting of a grip-member and a bar adapted to have one end of the saw-blade attached thereto, a link pivoted at one end to the grip member and adapted to have the remaining end of the saw-blade attached to its opposite end, and a thrust lever pivoted at one end to said link and having a sliding-fulcrum engagement with the said bar.

6. A hack-saw having a supporting frame for a saw-blade consisting of a grip member and a bar adapted to have one end of the saw-blade attached thereto, a link pivoted at one end to the grip member and adapted to have the remaining end of the saw-blade attached to its opposite end, and a thrust-lever pivoted at one end to said link and having in its opposite end a perforation through which the said bar passes.

7. A hack-saw having a supporting frame for a saw-blade consisting of a grip member and a bar adapted to have one end of the saw-blade attached thereto, a link pivoted at one end to the grip member and adapted to have the remaining end of the saw-blade attached to its opposite end, and a thrust-lever pivoted at one end to said link and having in its opposite end a perforation through which the said bar passes, said link having a face curved concentric to the pivot point of the thrust lever and adapted to serve as an abutment for the latter.

8. A hack-saw having a supporting frame for a saw-blade comprising a bar and a grip member slidable thereon and a link device for tensioning said blade in said frame, the operation of said device causing the said grip to bind to said bar.

9. A hack-saw having a supporting frame for a saw-blade comprising a bar and a grip member slidably mounted thereon, a link pivoted at one end to said grip member at a point removed from the point of engagement between the latter and the said bar, and a thrust-lever adapted to engage the link and in coöperation with the saw-blade to swing the grip member upon the said bar to cause it to bind thereto and swing the link to tension the saw-blade.

Signed at city, county, and State of New York, this 23rd day of December, 1916.

HARRY C. GAMAGE.

Copies of this patent may be obtained for five cents each, by addressing the "Commissioner of Patents, Washington, D. C."